US008021547B2

(12) United States Patent
Hukki

(10) Patent No.: US 8,021,547 B2
(45) Date of Patent: Sep. 20, 2011

(54) SCREEN CLAMP

(76) Inventor: Ari M. Hukki, Boynton Beach, FL (US)

( * ) Notice: Subject to any disclaimer, the term of this patent is extended or adjusted under 35 U.S.C. 154(b) by 0 days.

(21) Appl. No.: 12/772,859

(22) Filed: May 3, 2010

(65) Prior Publication Data

US 2010/0276343 A1 Nov. 4, 2010

Related U.S. Application Data

(60) Provisional application No. 61/215,092, filed on May 1, 2009.

(51) Int. Cl.
*B07B 1/48* (2006.01)
*B07B 1/49* (2006.01)
*B01D 33/00* (2006.01)

(52) U.S. Cl. ........ 210/232; 210/388; 209/399; 209/403; 209/405

(58) Field of Classification Search .................. 210/232, 210/388; 209/399, 403, 405
See application file for complete search history.

(56) References Cited

U.S. PATENT DOCUMENTS

| | | | | |
|---|---|---|---|---|
| 5,186,333 | A * | 2/1993 | Pierson et al. | 209/370 |
| 5,615,776 | A * | 4/1997 | Bjorklund et al. | 209/403 |
| 6,935,511 | B2 * | 8/2005 | Seyffert et al. | 209/404 |
| 2003/0057140 | A1 * | 3/2003 | Hukki et al. | 209/405 |
| 2006/0037891 | A1 * | 2/2006 | Lilie et al. | 209/397 |

* cited by examiner

*Primary Examiner* — Thomas M Lithgow
(74) *Attorney, Agent, or Firm* — Strasburger & Price, LLP

(57) ABSTRACT

The present invention relates to an apparatus and method for the easy installation or removal of screen elements from a shaker table without the use of tools. Pneumatic cylinders are used to move hold down bars up and down to either allow for screen elements to be installed or removed from the screen bed section assembly, or to clamp them into the screen bed section assembly of a shaker so that the screen elements will not move during shaker operations.

19 Claims, 19 Drawing Sheets

SCREEN CLAMP

CROSS-REFERENCE TO RELATED APPLICATIONS

This application is based on and claims priority under 35 USC §119(e) of U.S. Provisional Patent Application No. 61/215,092, filed May 1, 2009 and entitled "Screen Clamp," which is incorporated by reference herein.

STATEMENT REGARDING FEDERALLY-SPONSORED RESEARCH OR DEVELOPMENT

N/A

NAMES OF THE PARTIES TO A JOINT RESEARCH AGREEMENT

N/A

REFERENCE TO SEQUENCE LISTING

N/A

BACKGROUND OF THE INVENTION

1. Field of the Invention

The present invention relates to screens for vibratory machinery and more particularly to shake table screening.

2. Description of the Related Art

Shaker tables are well known to filter solids from liquids in the oil, gas & petroleum industry. Screen elements are used to filter the solids from the liquids, however must be replaced periodically when they become clogged with solids or wear down. Easy installation and removal of the screen elements is hard to achieve. Typical practice is to install and remove the screen elements manually, which can be difficult to accomplish, and interrupts filtering operations for an extended period of time. Thus, there is a need for a method and apparatus that allows for the easy installation and removal of screen elements in a shake table. Unfortunately, such a method and apparatus has not been available to date.

BRIEF SUMMARY OF INVENTION

In this invention, an apparatus and method are used to easily install and remove multiple curved screen elements used for filtering solids from liquids in a shaker table. The apparatus is comprised of a set of hold down bars that are guided through a carrier frame. The carrier frame holds multiple curved screen elements. The hold down bars are connected to a carrier frame mounting bracket. This entire assembly sits on top of a screen bed that houses pneumatic cylinders. In addition to the carrier frame mounting bracket being connected to the hold down bars, it is also connected to the pistons of the pneumatic cylinder heads located in the screen bed. When the pneumatic cylinders are actuated such that the pistons move upward, the hold down bars are pushed upward allowing the curved screen elements to be easily installed or removed by sliding them out of the carrier frame. When the pneumatic cylinders are actuated such that the piston is in a downward position, the hold down bars clamp the screen elements in place in the carrier frame, thus forming a screen clamp. No tools are required to install or remove the curved screen elements.

BRIEF DESCRIPTION OF THE FIGURES

For a further understanding of the nature and objects of the preferred embodiment, reference should be had to the following drawings in which like parts are given like reference numerals.

DETAILED DESCRIPTION OF THE INVENTION

Figure 1:
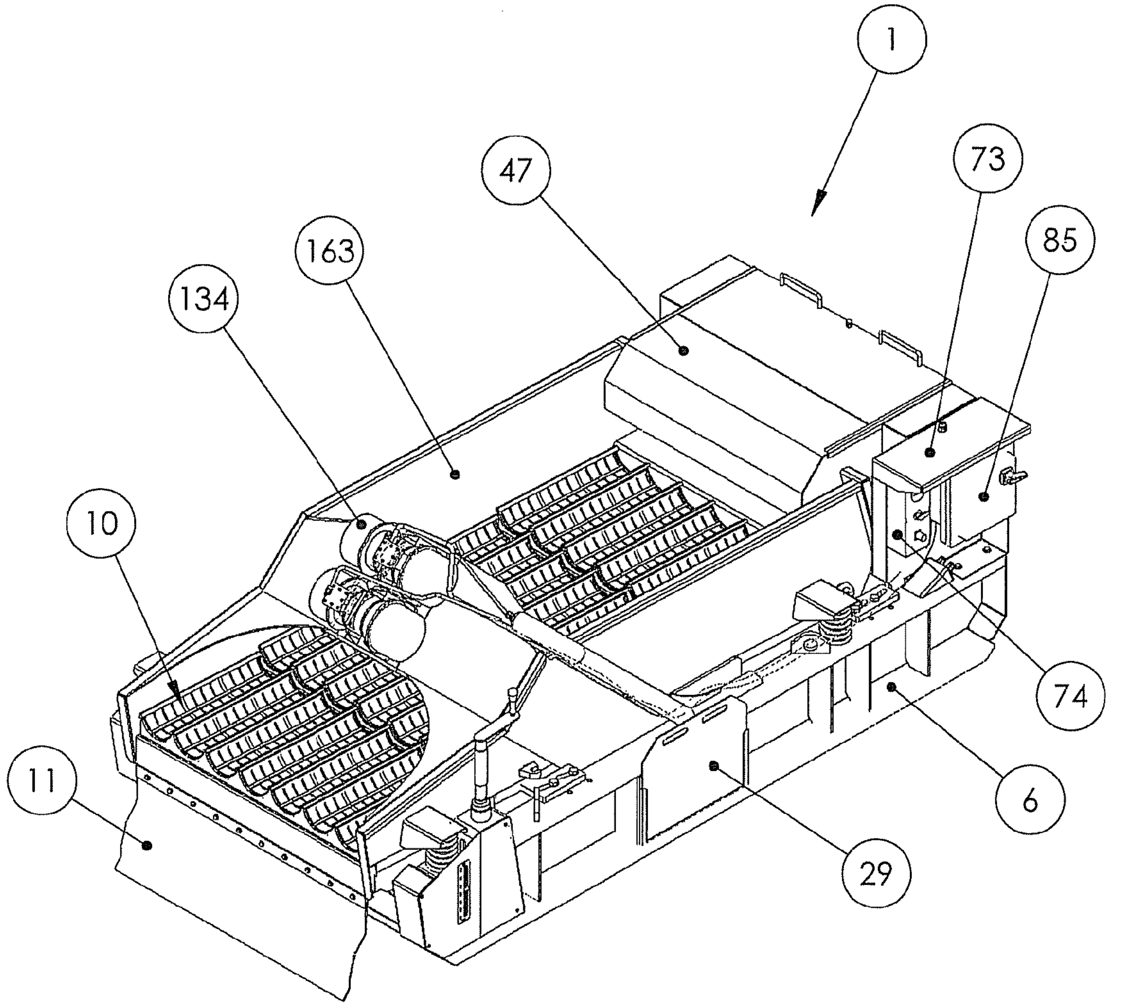
FIG. 1 is a general assembly of a shaker of the present invention.

A depiction of the general assembly of a shaker 1 that is used with the apparatus and method of this invention can be seen in FIG. 1. The shaker 1 is comprised of a shaker base assembly 6, which provides a base in which a screen carrier assembly 10, shaker basket assembly 163 and feed box assembly 47 sits. In general, drilling mud is fed into the feed box assembly 47, which goes into a shaker basket assembly 163. The shaker basket assembly 163 contains a screen carrier assembly 10, which serves as a filter for the drilling mud. At least one motion generator 134 provides shaking motion to the shaker basket assembly 163. Any solids in the drilling mud are separated by the drilling mud moving through the screen carrier assembly 10. The strained drilling mud is discharged at the discharge port 29, and any solids removed from the drilling mud travels forward on top of the screen carrier assembly 10 and will be discharged over the discharge skirt 11.

In this invention, hold down bars 40 are pneumatically operated so that the screen elements 45 can be easily installed or removed in the screen carrier assembly 10. In order to operate the pneumatic controls, a control panel support stand

73 is mounted to the side of the shaker 1. An electrical control panel 85 is then attached to the control panel support stand 73. The control panel support stand 73 contains a pneumatic control panel 74, which pneumatically controls the operation of the screen carrier assembly 10.

Figure 2:
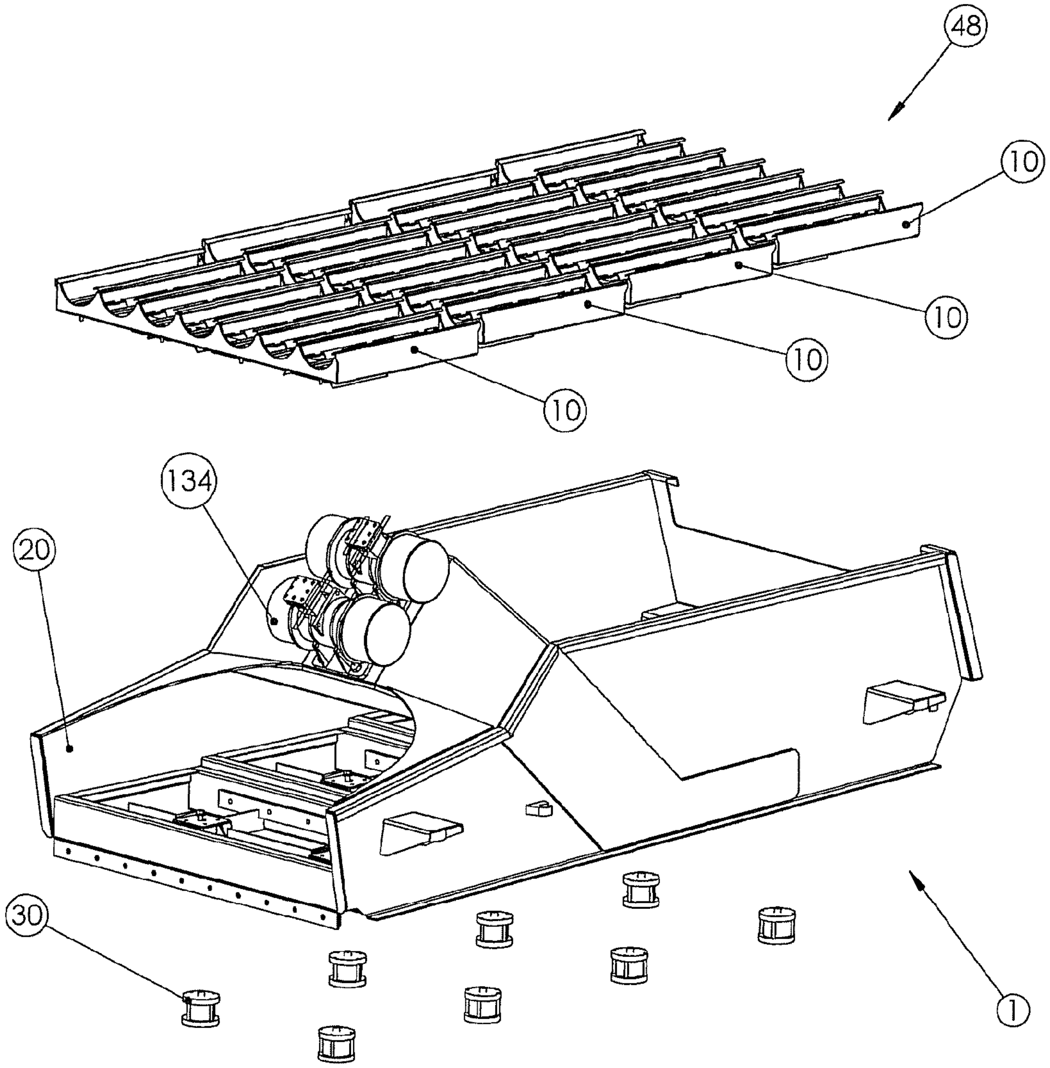
FIG. 2 is an exploded view of a shaker assembly.

FIG. 2 depicts an exploded view of a shaker 1. Multiple screen carrier assemblies 10 comprise a screen carrier section assembly 48, which is set inside the shaker 1. Each screen carrier section 10 is set inside a screen deck assembly 20 within the shaker 1, and is operated pneumatically. Each screen carrier section 10 is ideally operated by two pneumatic cylinders 30, which are operated at the pneumatic control panel 74.

Figure 3:
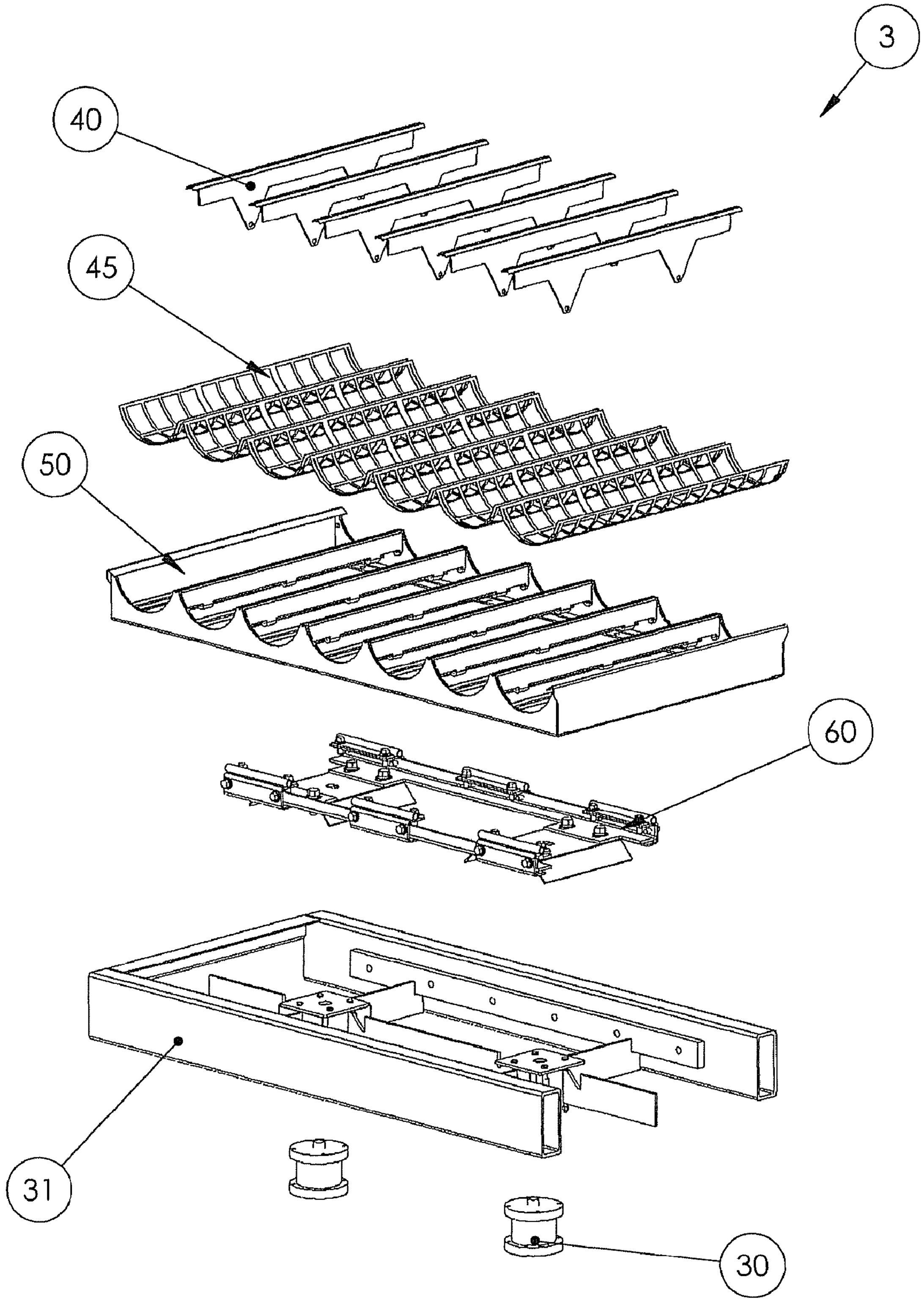
FIG. 3 is an exploded view of screen bed assembly.

An exploded screen bed section assembly 3 is depicted in FIG. 3. Multiple screen bed section assemblies 3 sit one after the other inside the shaker 1, and on top of the shaker base assembly 6 as shown in FIG. 1. In FIG. 3, a screen bed section 3 is comprised of a screen bed 31 and an area to house one or more pneumatic cylinders 30. The screen bed section 3 forms the base of the assembly 3. Preferably two pneumatic cylinders 30 are connected to each screen bed section 31. A carrier frame mounting bracket assembly 60 is attached to the screen bed section 31 at the pneumatic cylinder 30 locations. The carrier frame mounting bracket assembly 60 is sandwiched between the carrier frame 50 and the screen bed 31, with the carrier frame 50 sitting on the screen bed 31. Hold down bars 40 are inserted through the carrier frame 50 and bolted to the carrier frame mounting bracket assembly 60. When the hold down bars 40 are lifted to an upward position, curved screen elements 45 can be slid in and out of the carrier frame 50. After the screen elements 45 are placed inside the carrier frame 50, the hold down bars 40 can be lowered to clamp the screen elements 45 in place.

Figure 4:
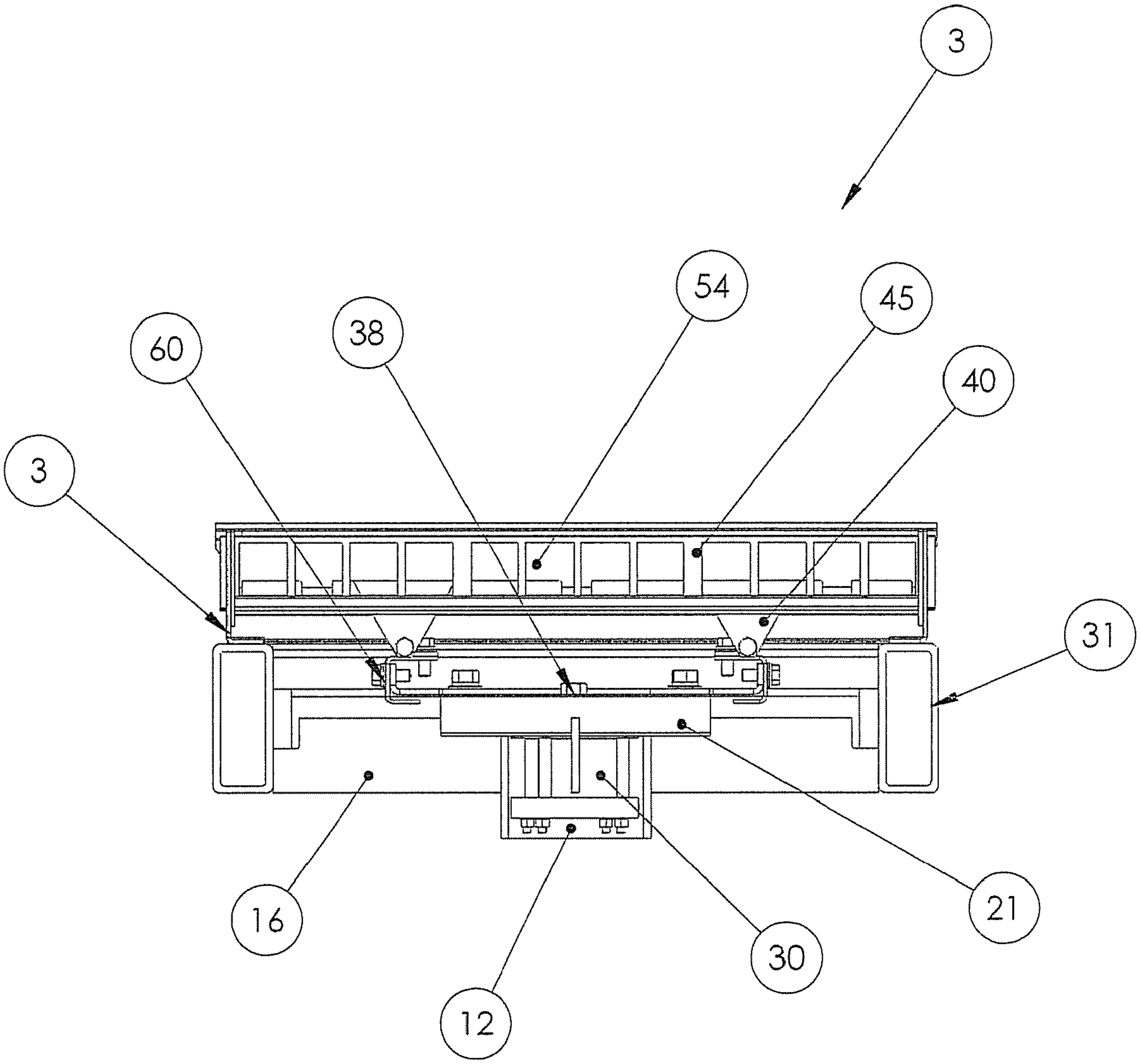
FIG. 4 is a cross sectional view of a closed screen bed assembly.

FIG. 4 shows a cross sectional view of the screen bed assembly section 3 when the hold down bars 40 are in a closed position. In FIG. 4, the screen bed section 31 contains pneumatic cylinder holder cups 12, which house pneumatic cylinders 30. The pneumatic cylinder holder cups 12 are supported and connected to the screen bed section 31 by pneumatic cylinder holder support brackets 16. The carrier frame mounting bracket assembly 60 attaches to the screen bed section 31 by bolting a clamp plate 21 to the piston 38 of a pneumatic cylinder 30. The carrier frame mounting bracket assembly 60 is then bolted to the hold down bars 40, which are slid through guides 54 located between each screen element 45 in the carrier frame 50. The carrier frame 50 sits between the screen bed section 31 and the screen elements 45 that are clamped down by the hold down bars 40. FIG. 4 shows that the carrier frame front scallop plate 2 sits on the screen bed section 31, and is also locked into place by the hold down bars 40.

Figure 5:
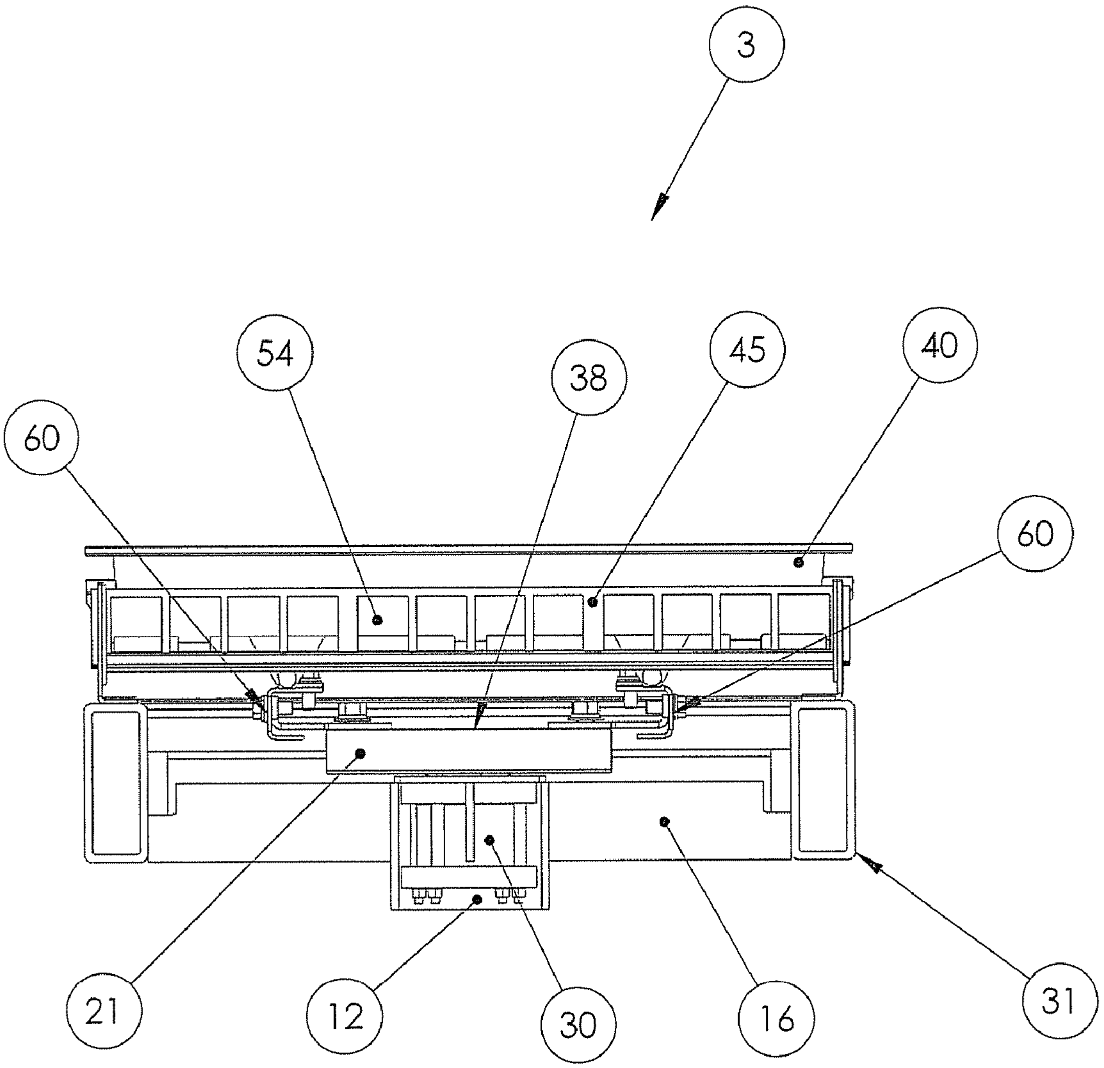
FIG. 5 is a cross sectional view of a screen bed assembly with hold down bars in an upward position for screen element removal.
Figure 6:
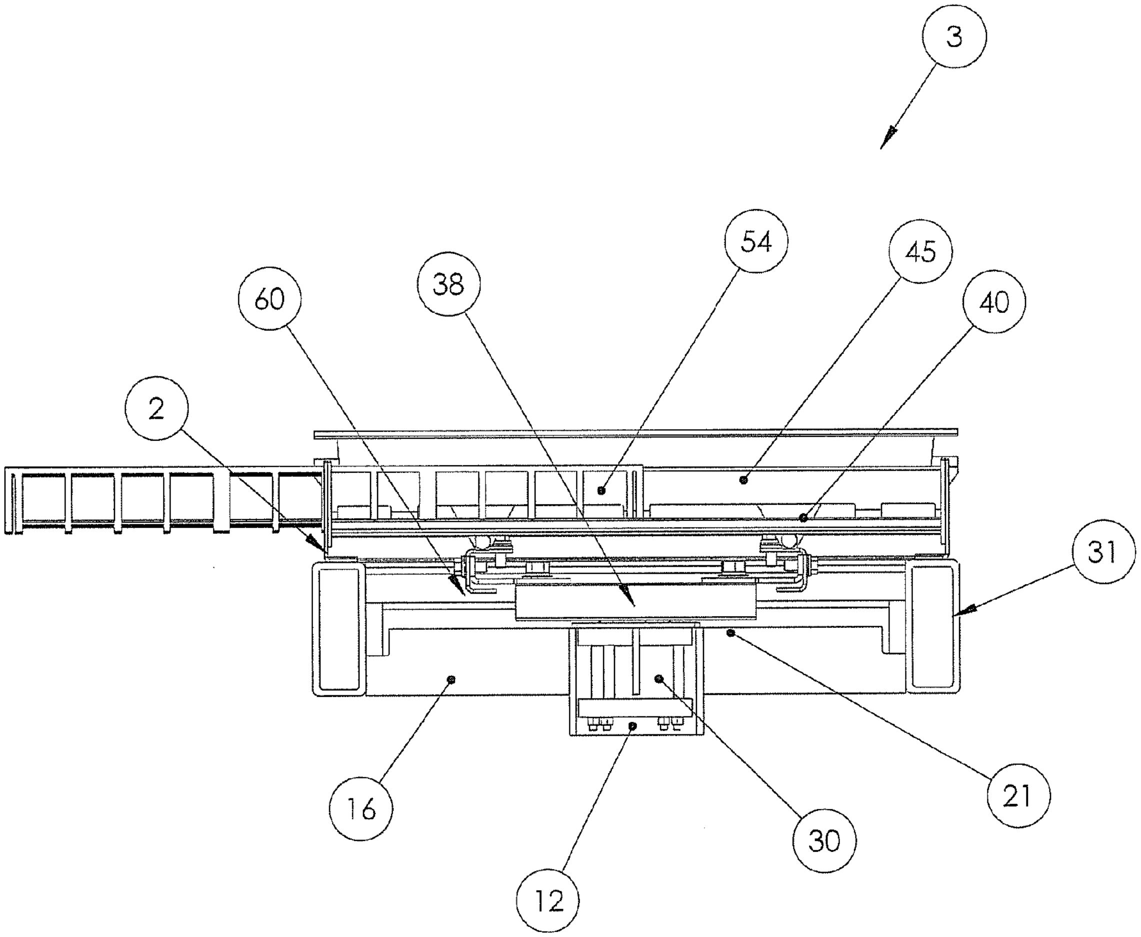
FIG. 6 is a cross sectional view of a screen bed assembly with a screen element moved away from the carrier frame.

FIG. 5 is similar to FIG. 4, except that the hold down bar 40 is in an upward position. The hold down bar 40 is placed in an upward position when the pneumatic cylinder piston 38 of the pneumatic cylinder 30 is actuated and extends upward. When the hold down bar 40 is in an upward position, the screen elements 45 can easily be installed or removed. FIG. 6 shows the screen element 45 as it is moved either into or out of the screen bed assembly.

Figure 7:
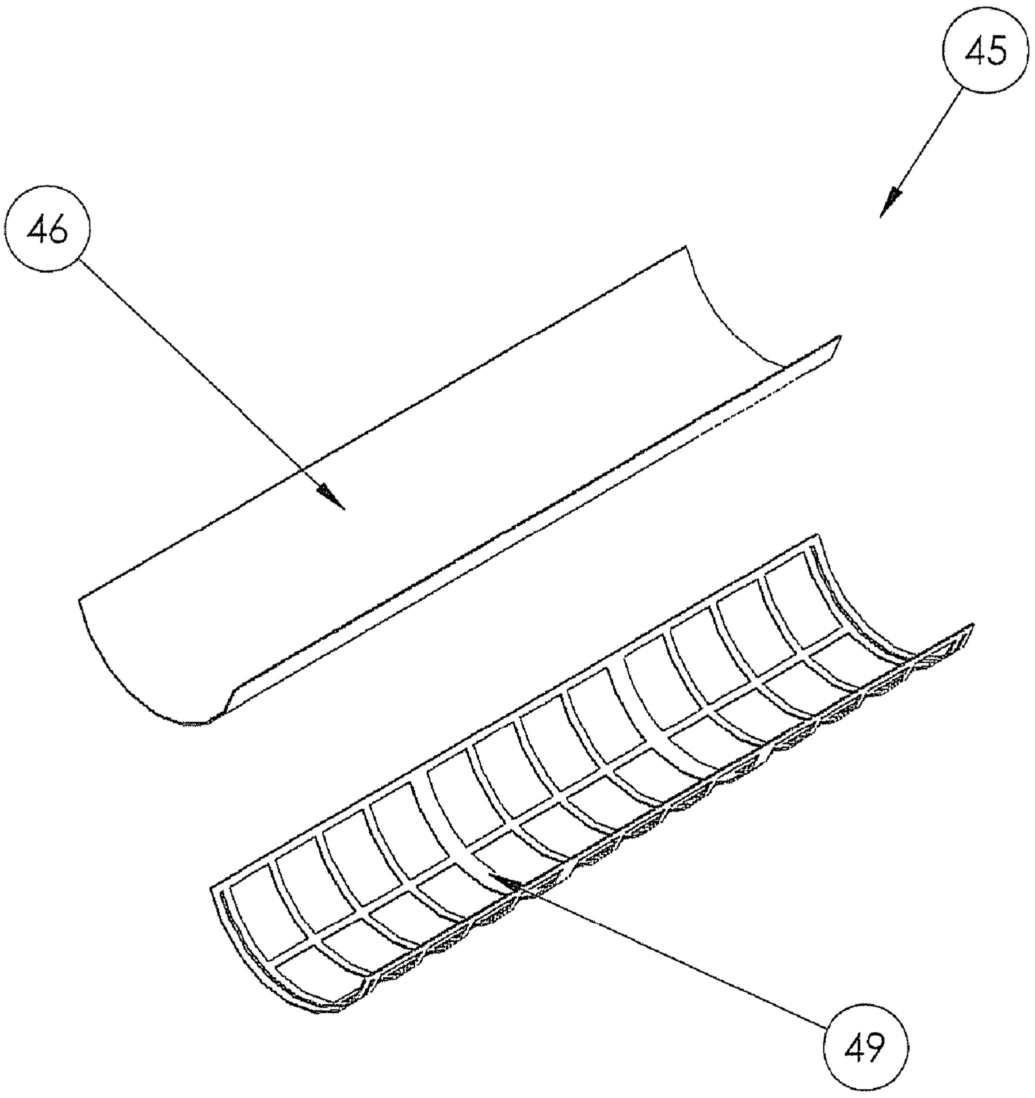
FIG. 7 is an exploded view of a screen element assembly of the present invention.

FIG. 7 shows a detailed view of a screen element 45. The screen element 45 is comprised of a curved webbed filter 49, preferably including stamped metal, which is then preferably coated with an epoxy powder coating. A mesh screen 46, preferably made of wire cloth, is placed on top of the filter 49, and heated in a heat press until the mesh screen 46 is affixed to the filter 49 and forms the individual screen elements 45.

Figure 8:
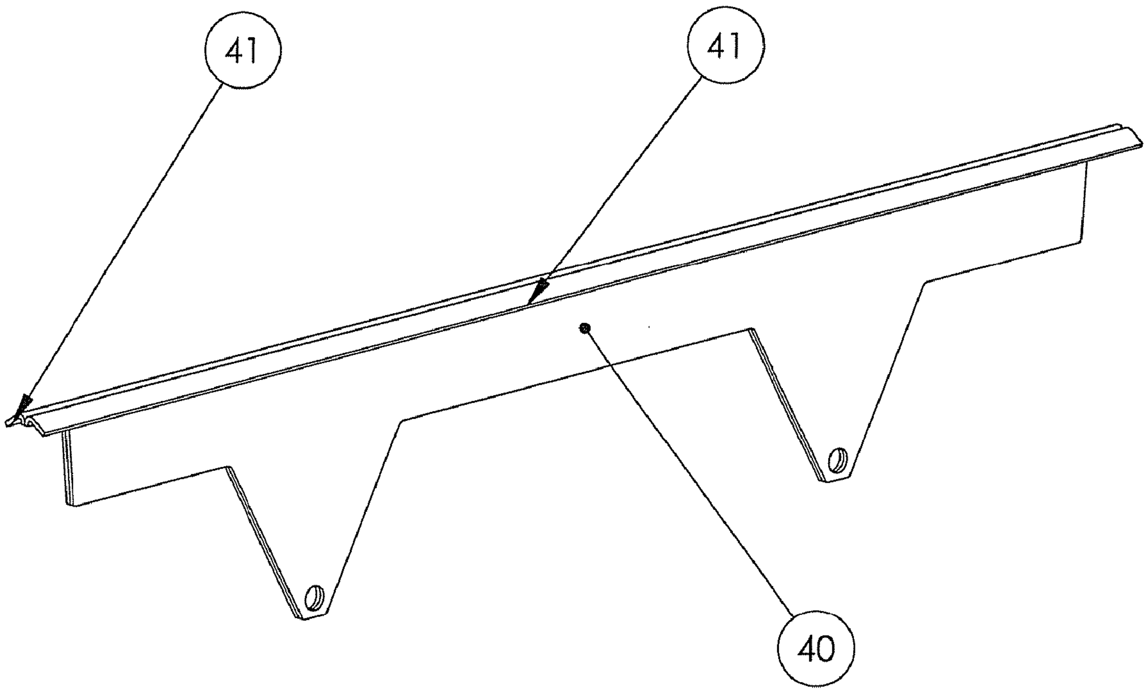
FIG. 8 is a depiction of a hold down bar of the present invention.

FIG. 8 shows a detailed view of a hold down bar 40. Two metal plates, each with its own ledge 41, are welded together to form a hold down bar 40. The hold down ledges 41 serve to clamp the screen elements 45 in place when the hold down bar 40 is in a closed position.

Figure 9:
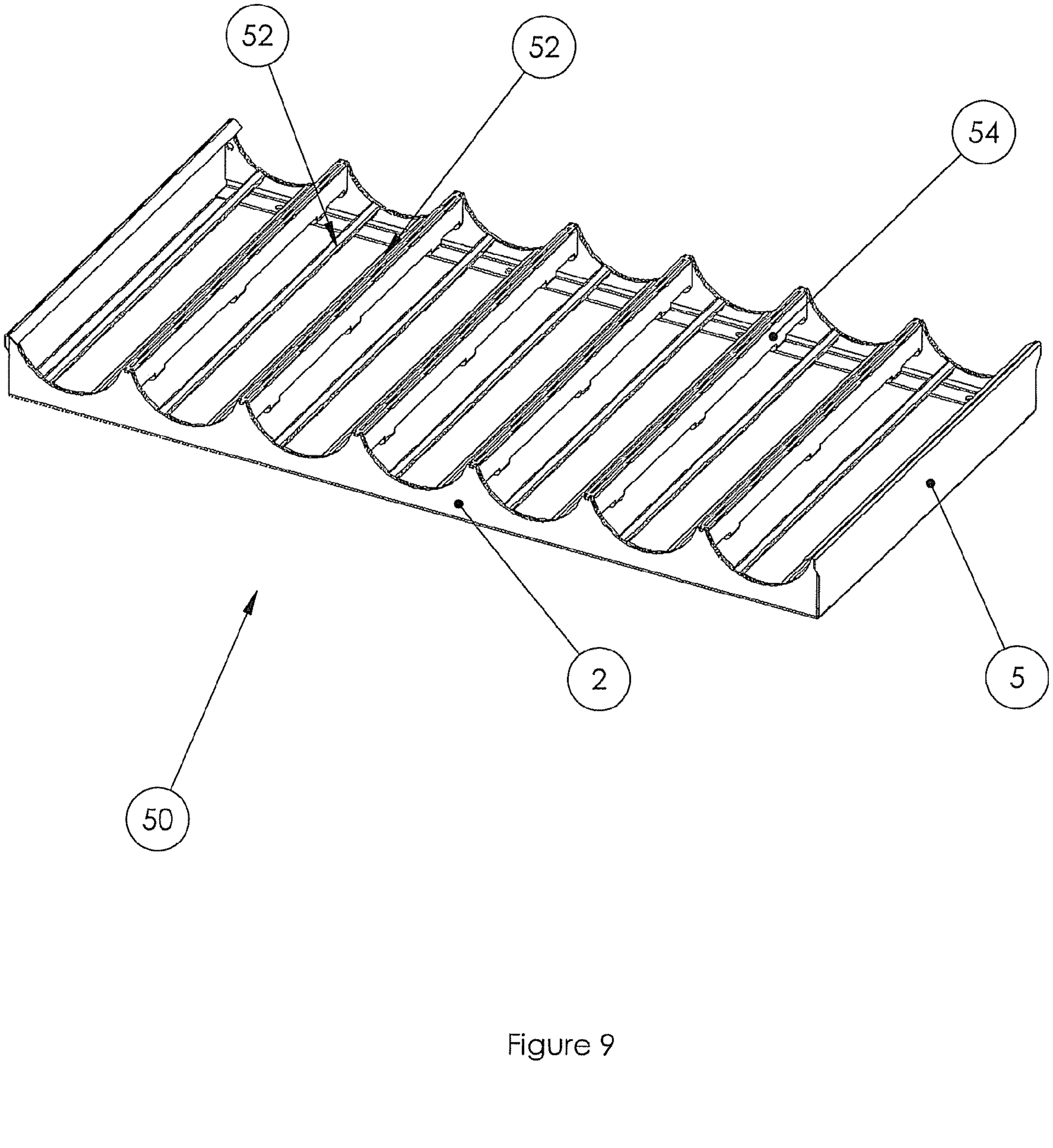
FIG. 9 is a depiction of a carrier frame of the present invention.

FIG. 9 is a detailed view of a carrier frame 50. Each carrier frame includes, for example, two carrier frame side plates 5 and two carrier frame scallop plates 2, which are welded together to form a frame. The carrier frame 50 sits on top of the screen bed 31, and supports the screen elements 45. To better support the screen elements 45, screen element support bars 52, preferably two, are welded beneath each scallop in the scallop plates 2 where the curved portion of the screen element 45 will rest. In between where each screen element 45 will rest, a hold down bar guide 54 is welded to the carrier frame 50. The hold down bar guide 54 provides the location where the hold down bars 40 will move up and down through the carrier frame 50. As discussed previously, when the hold down bars 40 are in an upward position, screen elements 45 can be easily installed and removed. However, when the hold down bars 40 are in a lowered position through the hold down bar guide 54, the hold down bar ledges 41 will clamp the screen elements 45 into the carrier frame 50.

Figure 10:
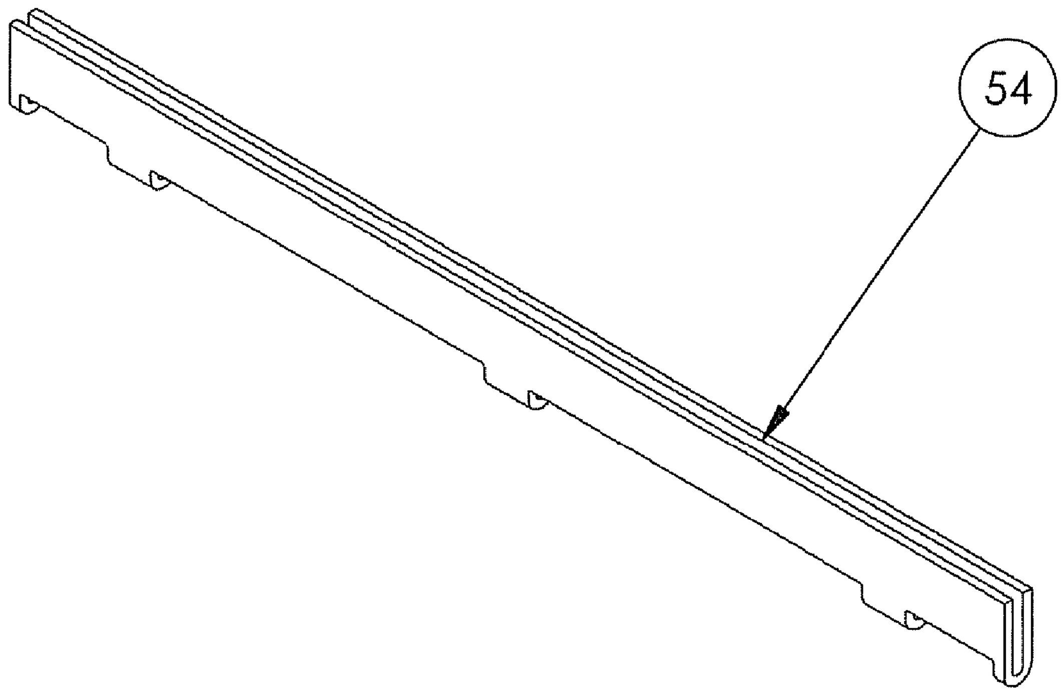
FIG. 10 is a depiction of a hold down bar guide of the present invention.

FIG. 10 is a detailed view of the hold down bar guide 54, which is placed between each scallop in the scallop plates 2 of the carrier frame 50. The hold down bar guide 54 is preferably a u-shaped piece of metal with channels cut so that the hold down bars 40 can slip through the hold down bar guide 54 and connect to the carrier frame mounting bracket assembly 60.

Figure 11:
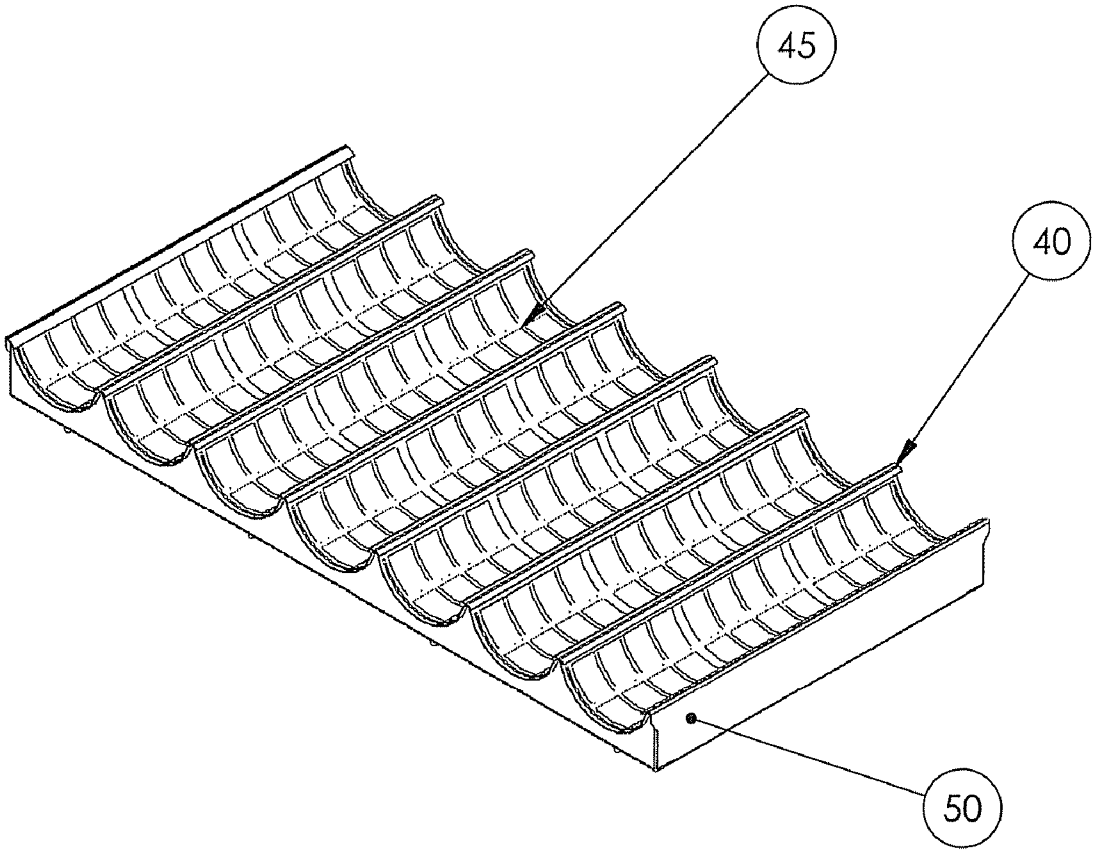
FIG. 11 is a depiction of a carrier frame with screen elements of the present invention.

FIG. 11 depicts the carrier frame 50 when the screen elements 45 are in place, and the hold down bars 40 are in the closed position.

Figure 12:
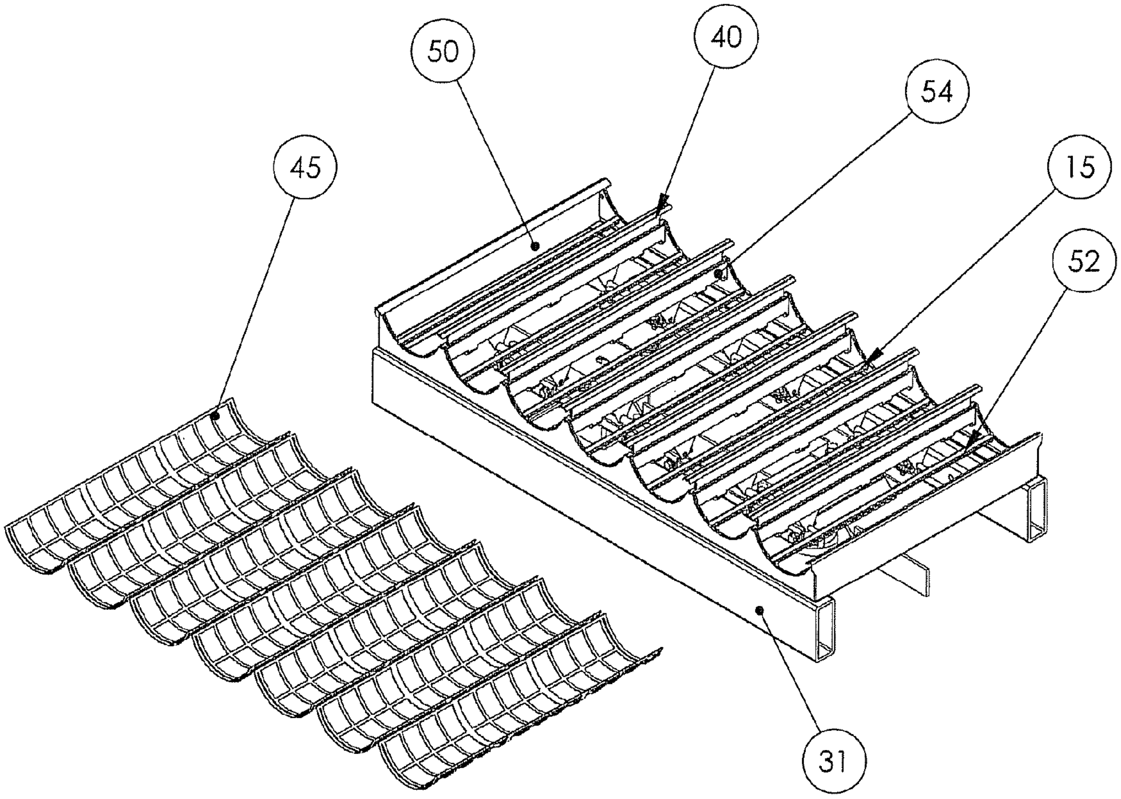
FIG. 12 is a depiction of a screen carrier with screen elements removed of the present invention.

FIG. 12 shows another view of the screen bed section assembly 3 with the screen elements 45 removed.

Figure 13:
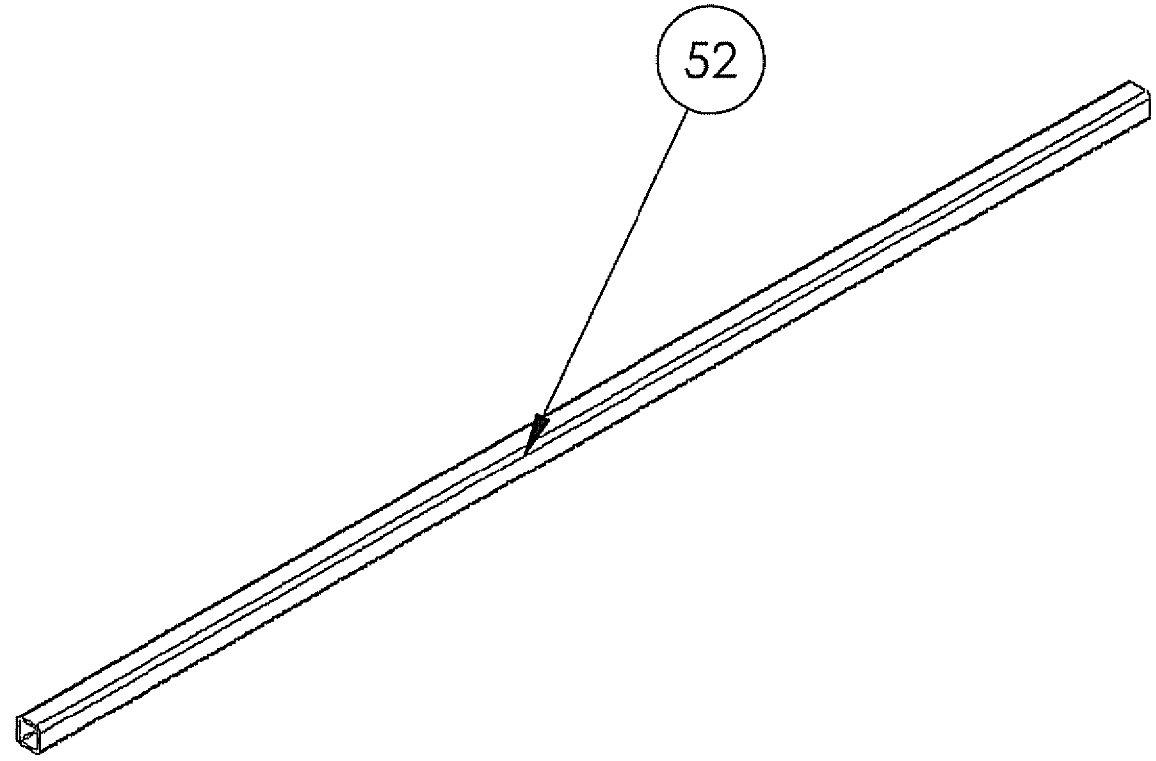
FIG. 13 is a depiction of a screen element support bar of the present invention.

FIG. 13 is a detailed view of the screen element support bar 52, which sits at the bottom of each scallop in the scallop plates 2 of the carrier frame 50. The screen element support bar 52 is preferably metal, and preferably welded to the carrier frame 50. The use of two screen element support bars 52 is preferred to support each screen element 45 in the carrier frame 50.

Figure 14:
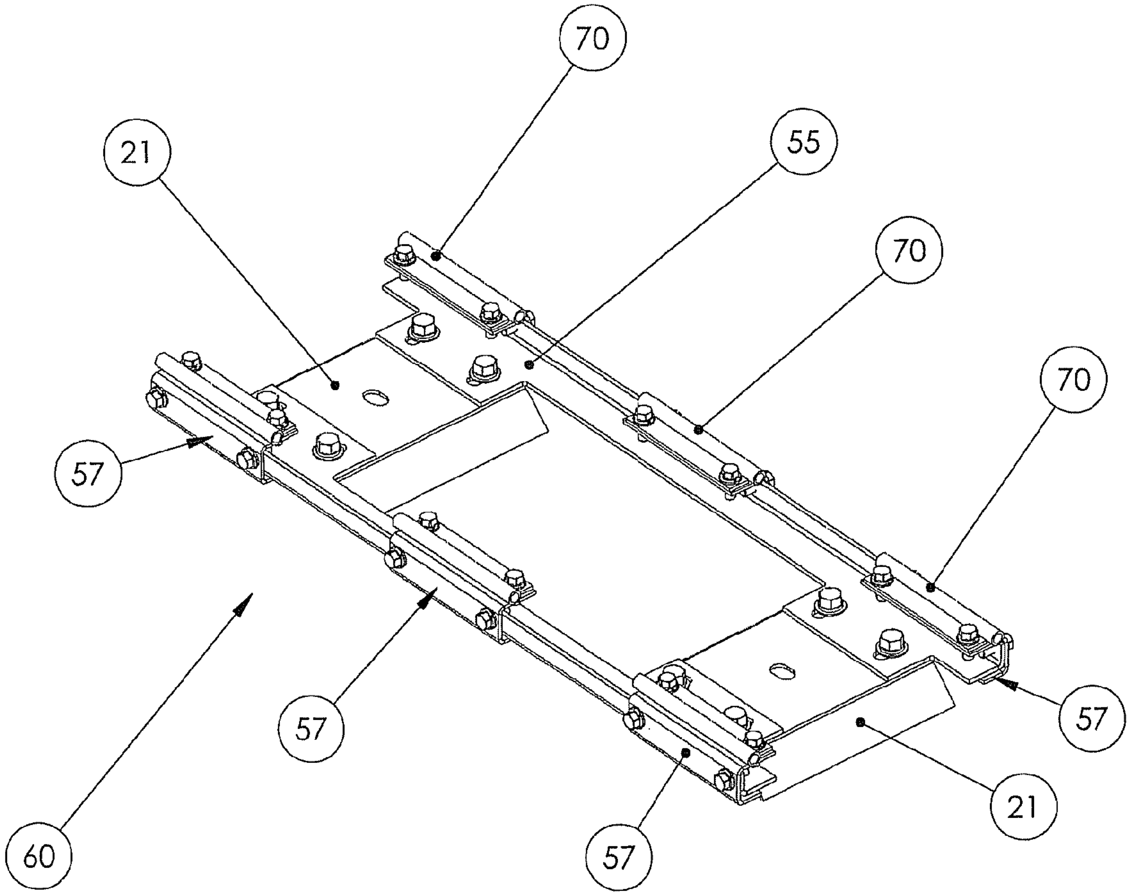
FIG. 14 is a depiction of a screen carrier mounting bracket of the present invention.

FIG. 14 is a detailed view of the screen carrier mounting bracket 60. Two mounting bracket supports 55 are connected by two clamp plates 21. The preferable means of connection is by bolting the pieces together, although these pieces of the screen carrier mounting bracket 60 could be one continuous piece or could be connected by weld. Tube brackets 70 are affixed to a tube bracket adaptor 57, which is in turn attached to each mounting bracket support 55. Preferably, each tube bracket 70 and tube bracket adaptor 57 is metal, and each is attached to the respective component by bolting the components together. However, it is envisioned that these components could be attached by other means known in the art.

Figure 15:
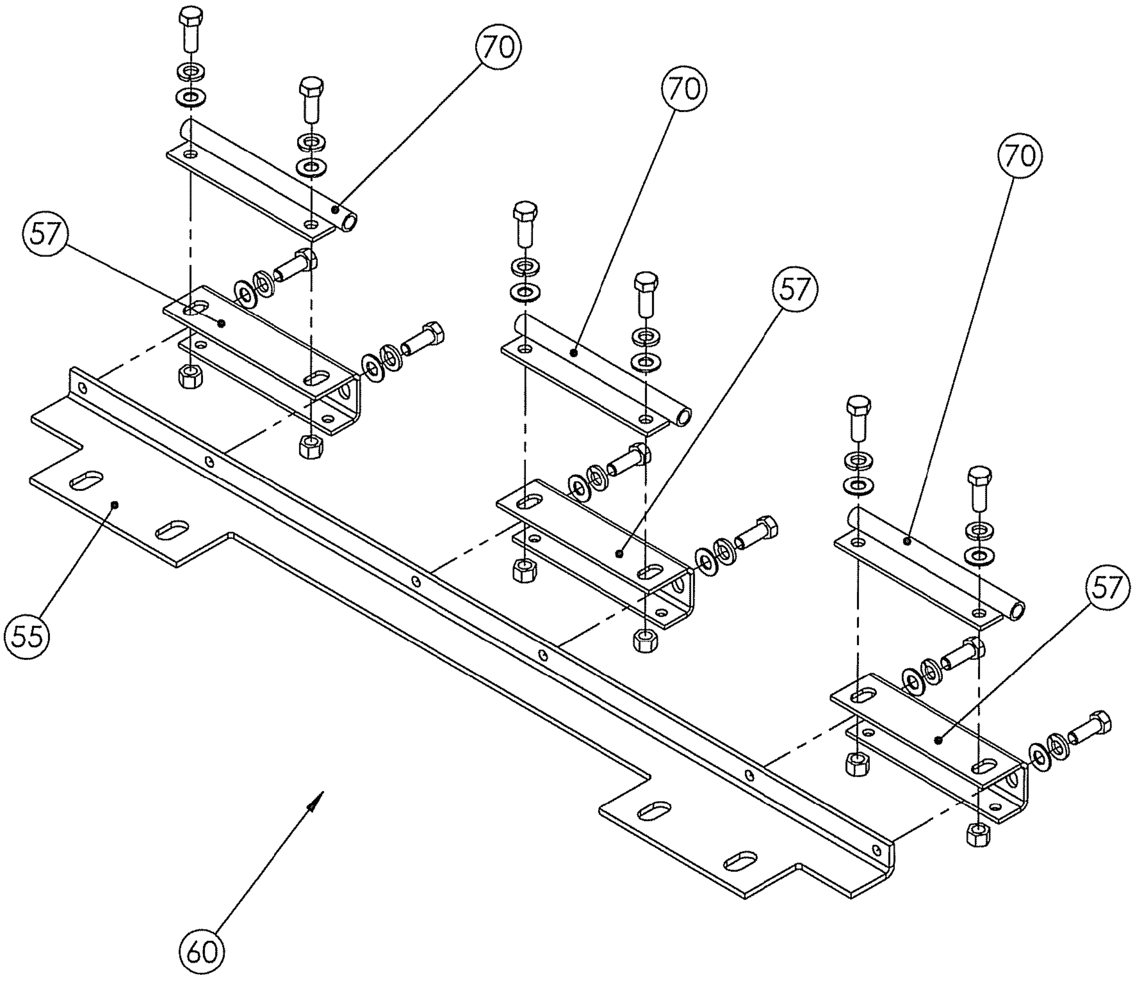
FIG. 15 is an exploded view of a screen carrier mounting bracket of the present invention.
Figure 16:
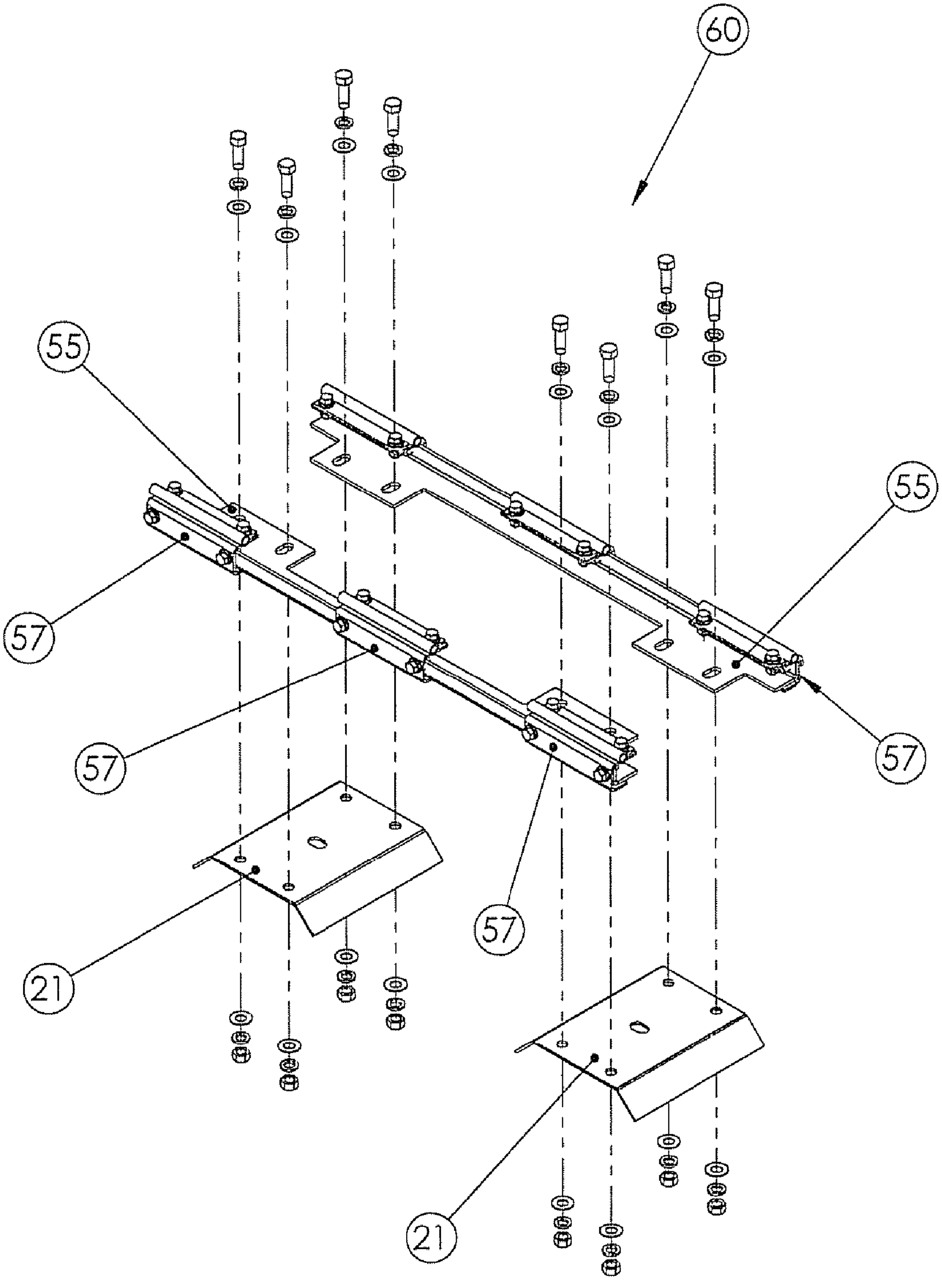
FIG. 16 is an exploded view of a clamp plate assembly in the screen carrier mounting bracket of the present invention.

FIG. 15 is an exploded view of the screen carrier mounting bracket 60 and shows the preferred embodiment of bolting tube bracket adapters 57 to the mounting bracket support 55, and mounting tube brackets 70 to the tube bracket adaptors 57. FIG. 16 is another exploded view of the screen carrier mounting bracket 60 that shows the preferred embodiment of bolting the clamp plates 21 to the mounting bracket support 55.

Figure 17:
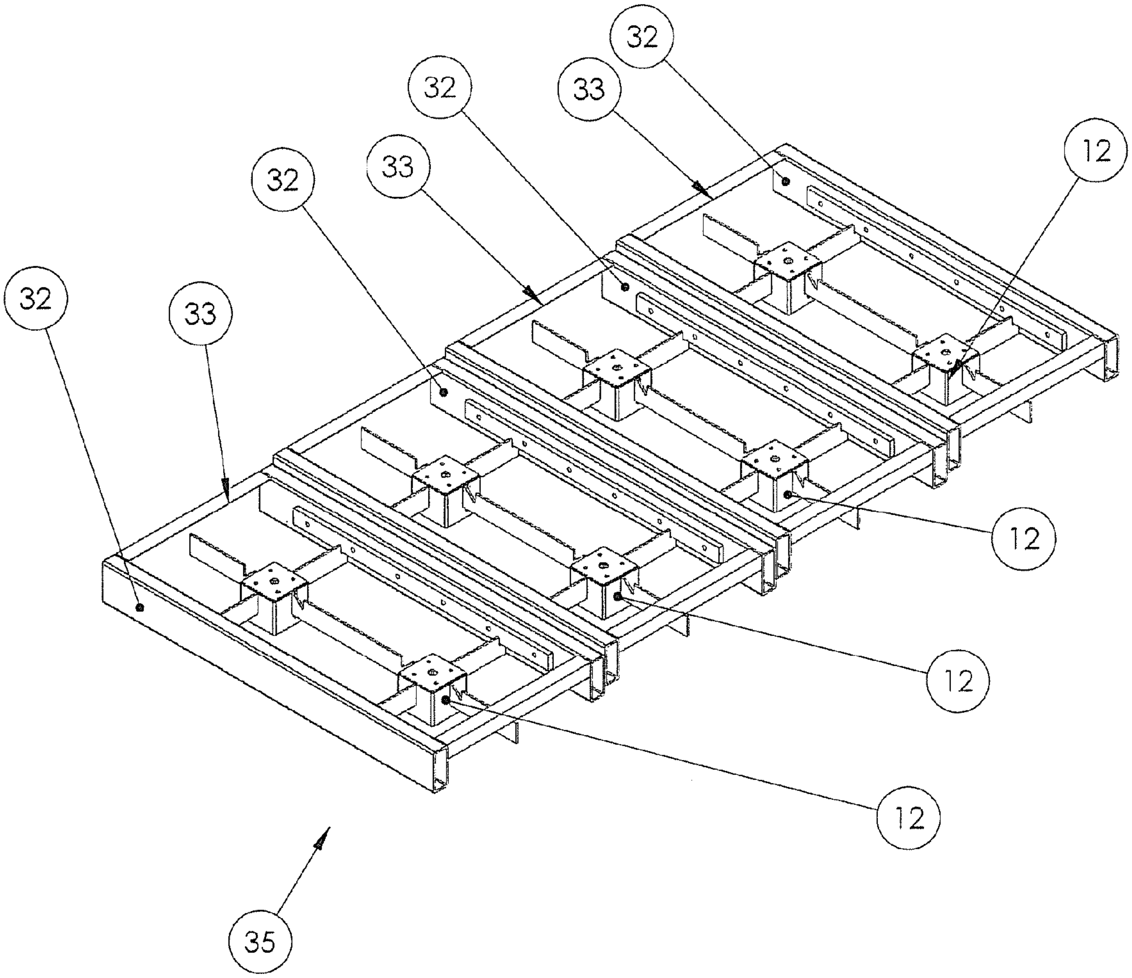
FIG. 17 is a depiction of a screen bed of the present invention.

The clamp plates 21 sit on the pneumatic cylinder cup holders 4 shown in FIG. 17. Each clamp plate 21 is bolted to the pneumatic cylinder piston 38 which is centered inside the pneumatic cylinder cup holder 4. The hold down bars 40 are bolted to the ends of the tube brackets 70 of the carrier frame mounting bracket assembly 60.

Figure 18:
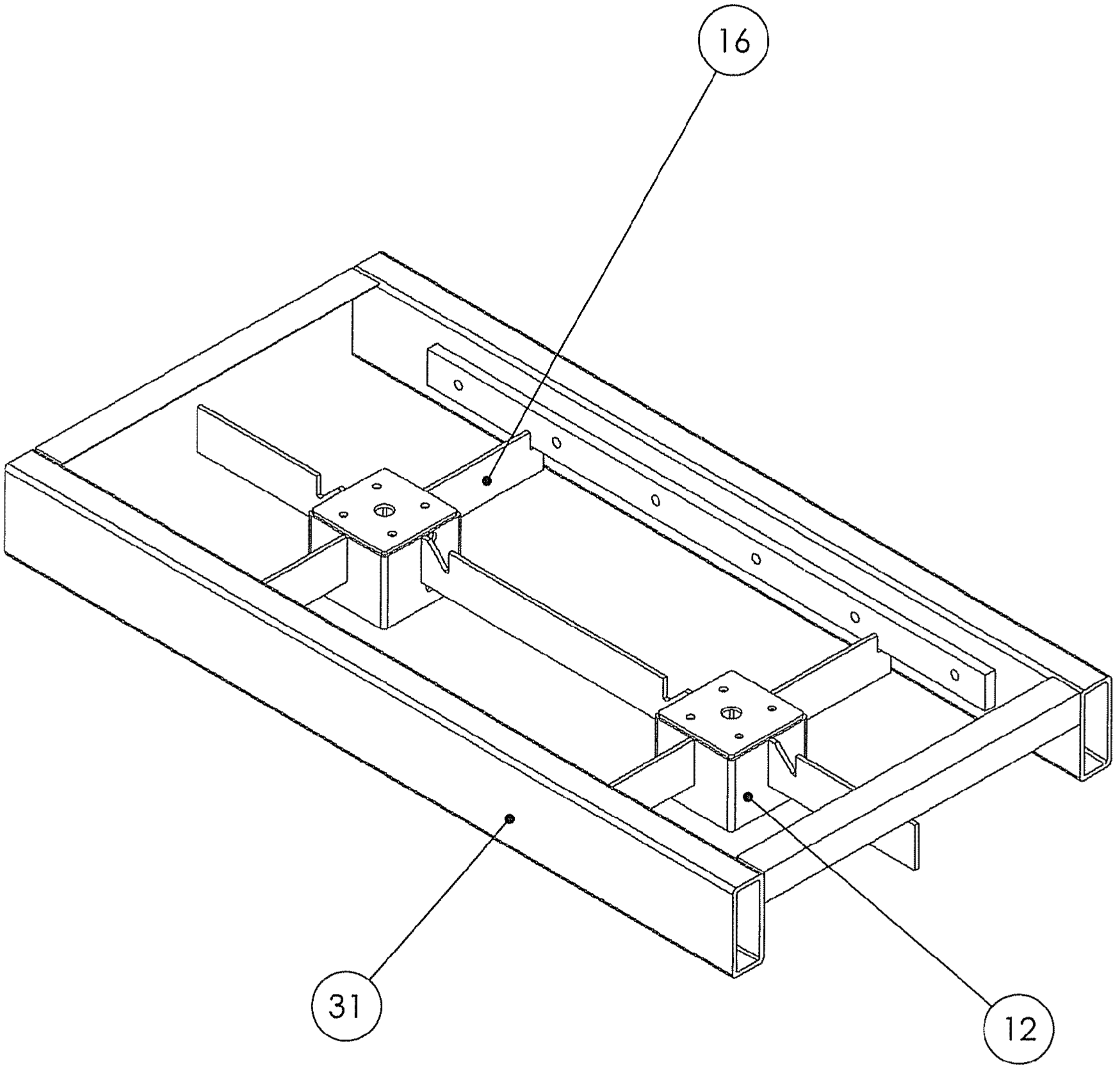
FIG. 18 is a depiction of a portion of a screen bed section of the present invention.
Figure 19:
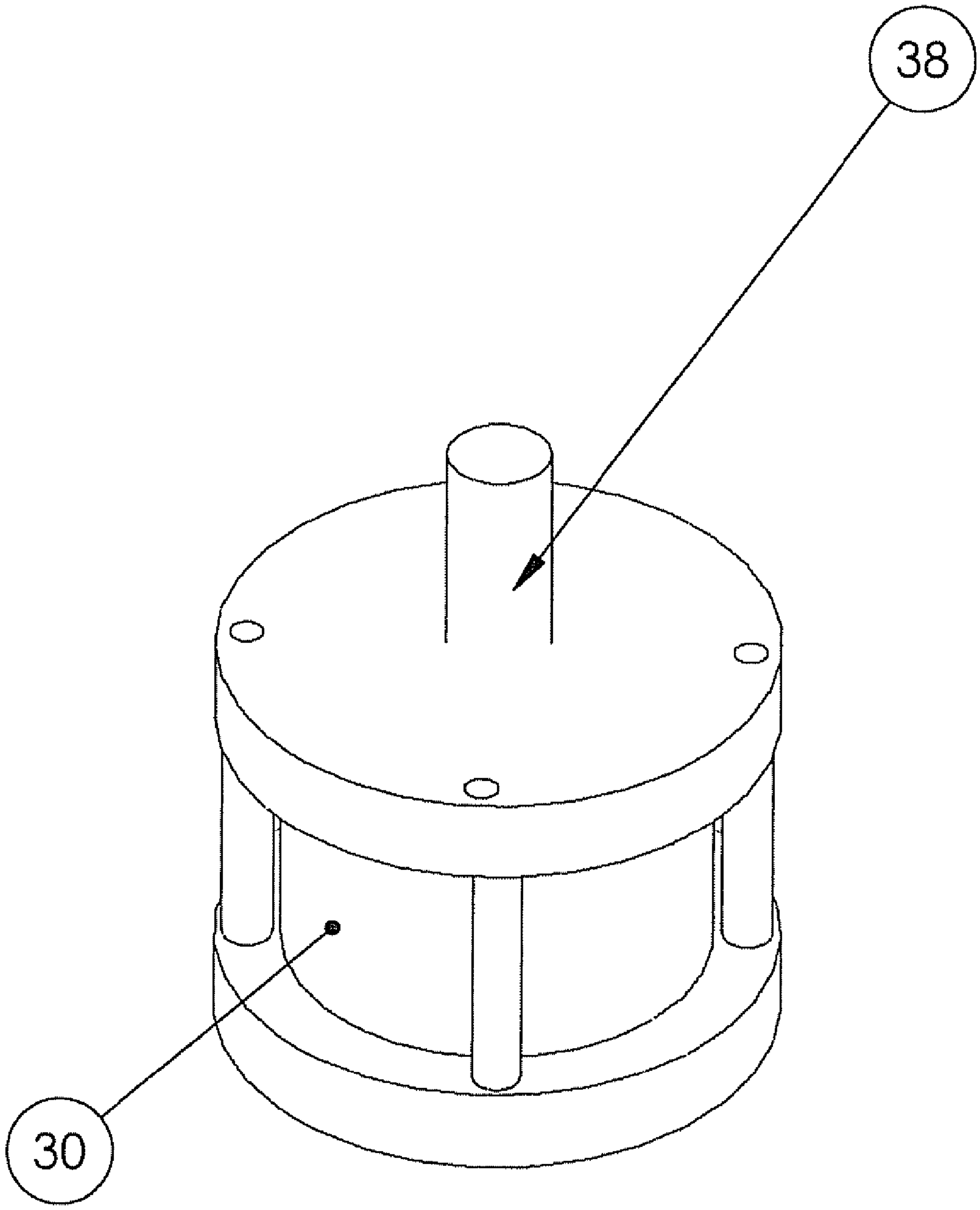
FIG. 19 is a depiction of a pneumatic cylinder of the present invention.

FIG. 17 shows a screen bed 35, which is comprised of front screen bed sections 32 and side screen bed sections 33, which make up an overall frame for the screen bed 35. FIG. 18 shows how each pneumatic cylinder holder cup 12 is braced by pneumatic cylinder holder support brackets 16, which are affixed to the screen bed sections 31, preferably by weld. FIG. 19 shows a pneumatic cylinder 30, which sits inside the pneumatic cylinder holder cup 12. The pneumatic cylinder piston 38 extends through the middle of the pneumatic cylinder holder cup 12 and is bolted to the clamp plate 21 of the screen carrier mounting bracket assembly 60.

I claim:

1. An apparatus for the installation and removal of curved screen elements in a mechanical shaker, comprising:

a screen bed, which houses at least one pneumatic control device;

a carrier frame, which sits on said screen bed, and where said curved screen elements are supported;

a plurality of hold down bars; and a carrier frame mounting bracket assembly, which is connected to said hold down bars and said pneumatic control device, where said pneumatic control device vertically positions said hold down bars;

wherein said carrier frame comprises a plurality of curved supports each having a valley between two peaks and supporting one of said curved screen elements;

wherein each of said curved supports shares at least one peak with another of said curved supports; and wherein there is one of said hold down bars slidingly disposed through said carrier frame at each of said shared peaks.

2. The apparatus of claim 1, wherein said carrier frame further comprises a plurality of hold down bar guides, wherein one of said hold down bar guides is attached at each of said shared peaks, and wherein each of said guides comprises a curved shape having a valley with an opening in said guide valley configured so that a portion of one of said hold down bars can slidingly move through said opening and remain connected with said carrier frame mounting bracket assembly during said vertical positioning.

3. The apparatus of claim 2, wherein said pneumatic control device is configured to move said hold down bars upward to a first position that does not resist the sliding movement of said screen elements into or away from said carrier frame, and downward to a second position that resists movement of said screen elements from said carrier frame and which clamps said carrier frame with said screen bed.

4. The apparatus of claim 3, wherein each of said hold down bars has two opposing ledges and each of said ledges is configured to clamp an edge of one of said screen elements against said carrier frame when said hold down bars are in said second position.

5. The apparatus of claim 4, wherein each of said hold down bars comprises two connected metal plates and each of said plates has one of said ledges.

6. An apparatus for the installation and removal of screen elements in a mechanical shaker, comprising:

curved screen elements;

a mounting bracket assembly;

a carrier frame, which sits on a screen bed and over the mounting bracket assembly and which supports the curved screen elements;

a plurality of hold down bars which are slid through the carrier frame and attached to the mounting bracket assembly;

a plurality of hold down bar guides each having a valley with a first opening;

a pneumatic cylinder having a piston, the mounting bracket assembly being connected to the piston of the pneumatic cylinder; and the hold down bars being configured to be pneumatically moved upward and downward through the carrier frame;

wherein said carrier frame comprises a plurality of curved supports each having a valley between two peaks and supporting one of said curved screen elements;

wherein each of said curved supports shares at least one peak with another of said curved supports;

wherein there is one of said hold down bar guides positioned at each of said shared peaks; and wherein there is one of said hold down bars slidingly disposed through said first opening of each of said hold down bar guides.

7. The apparatus of claim 6, wherein said hold down bars are configured to be pneumatically moved between a downward position that resists movement of said screen elements away from said carrier frame, and an upward position that does not resist the sliding movement of said screen elements into or away from said carrier frame.

8. The apparatus of claim 7, wherein each of said hold down bars has two ledges and each of said ledges is configured to clamp an edge of one of said screen elements to said carrier frame when said hold down bar is in said downward position.

9. The apparatus of claim 8, wherein each of said hold down bars comprises two connected metal plates and each of said plates has one of said ledges.

10. The apparatus of claim 9, wherein each of said hold down bar guides has a second opening, and wherein there is one of said hold down bars slidingly disposed through said first opening and said second opening of each of said hold down bar guides.

11. The apparatus of claim 10, wherein said piston is configured to be pneumatically moved upward to move said mounting bracket assembly upward, and wherein said piston is configured to be pneumatically moved downward to move said mounting bracket assembly downward.

12. A method for the installation and removal of curved screen elements in a mechanical shaker, comprising the steps of:

pneumatically moving a plurality of hold down bars up through openings in a carrier frame in said shaker to a first position that does not resist the sliding movement of said curved screen elements into or away from said carrier frame; and pneumatically moving said hold down bars down through said openings to a second position that resists the sliding movement of said curved screen elements into or away from said carrier frame, wherein said carrier frame comprises a plurality of curved supports each having a valley between two peaks and configured to support one of said curved screen elements, wherein each of said curved supports shares at least one peak with another of said curved supports, and wherein there is one of said hold down bars slidingly disposed through said carrier frame at each of said shared peaks.

13. The method of claim 12, further comprising the steps of:

sliding said screen elements on said curved supports when said hold down bars are in said first position;

clamping said screen elements to said carrier frame with ledges on said hold down bars when said hold down bars are in said second position; and locking said carrier frame with a screen bed with said ledges on said hold down bars when said hold down bars are in said second position.

14. The method of claim 13, further comprising the steps of:

shaking said screen elements with said mechanical shaker after the step of clamping;

moving said hold down bars to said first position after the step of shaking; and sliding said screen elements away from said carrier frame.

15. The method of claim 14, further comprising the steps of:

pneumatically moving a piston upward to move said hold down bars to said first position; and pneumatically moving said piston downward to move said hold down bars to said second position.

16. The method of claim 15, wherein said carrier frame has a plurality of hold down bar guides each having a "U" shape with a valley having an opening, wherein there is one of said hold down bar guides attached at each of said shared peaks, and wherein each of said openings has one of said hold down bars slidingly positioned therein.

17. The method of claim 16, wherein each of said hold down bars has two opposing ledges and each of said ledges is configured to clamp an edge of one of said screen elements against said carrier frame when said hold down bar is in said second position.

18. The method of claim 17, wherein each of said hold down bars comprises two connected metal plates and each of said plates has one of said ledges.

19. The apparatus of claim 18, wherein each of said hold down bar guides has two openings, and wherein there is one of said hold down bars slidingly disposed through said two openings of each of said hold down bar guides.

* * * * *